Oct. 3, 1967   R. FERGUSON   3,344,820
INDEX CONTROLLING MEANS FOR A TUBULAR SAWING APPARATUS
Filed June 15, 1965   4 Sheets-Sheet 1

INVENTOR.
RICHARD FERGUSON
BY Channing L. Richards &
Dalbert U. Shefte
ATTORNEYS

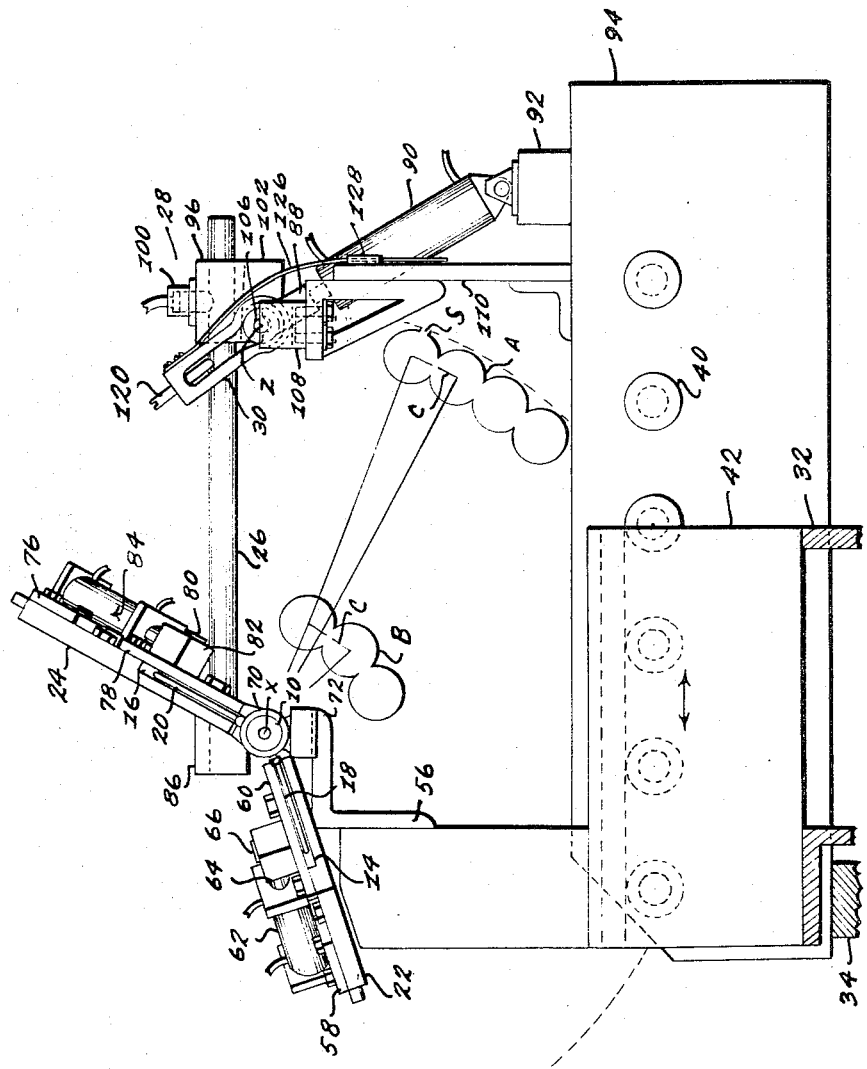

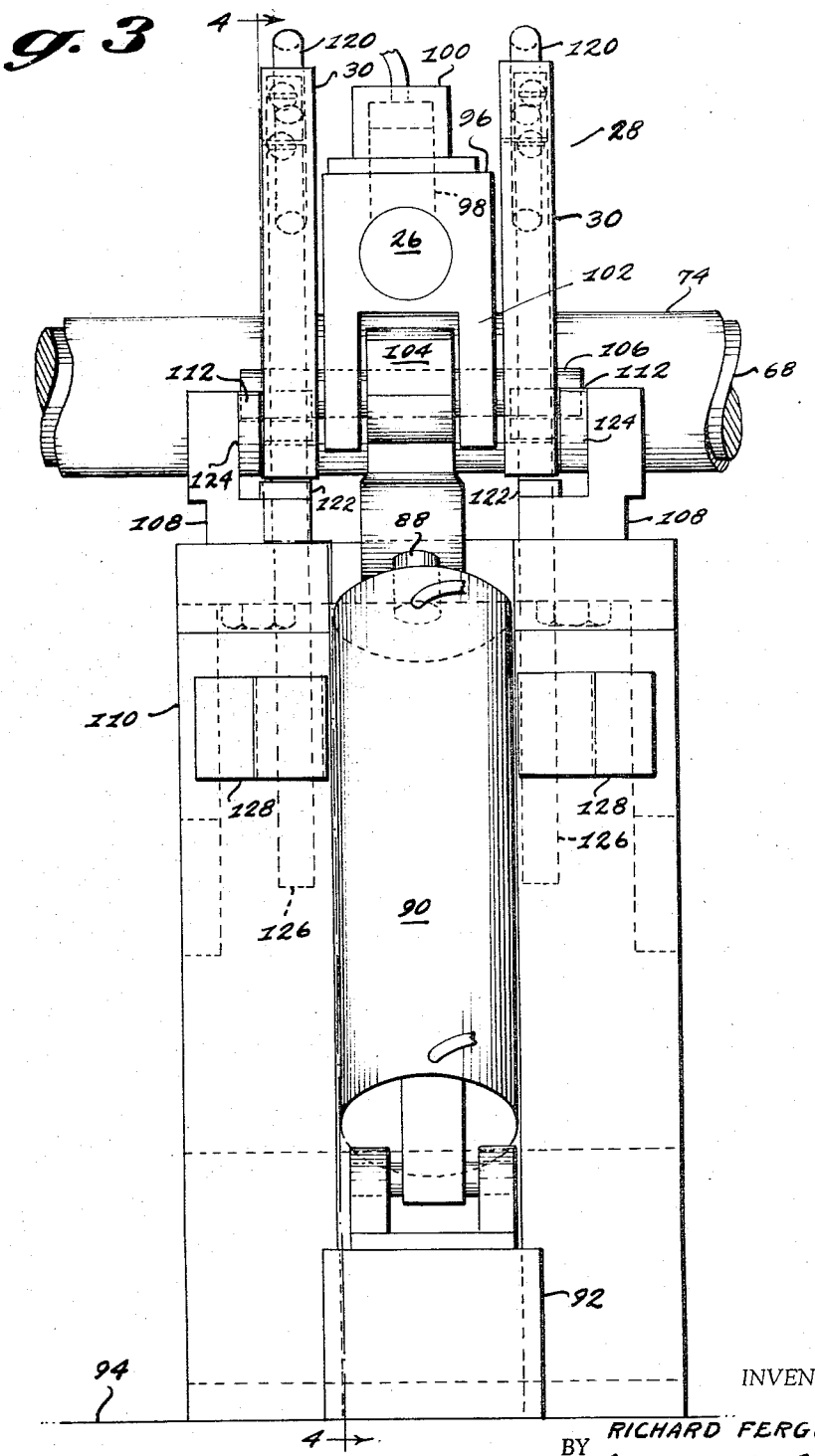

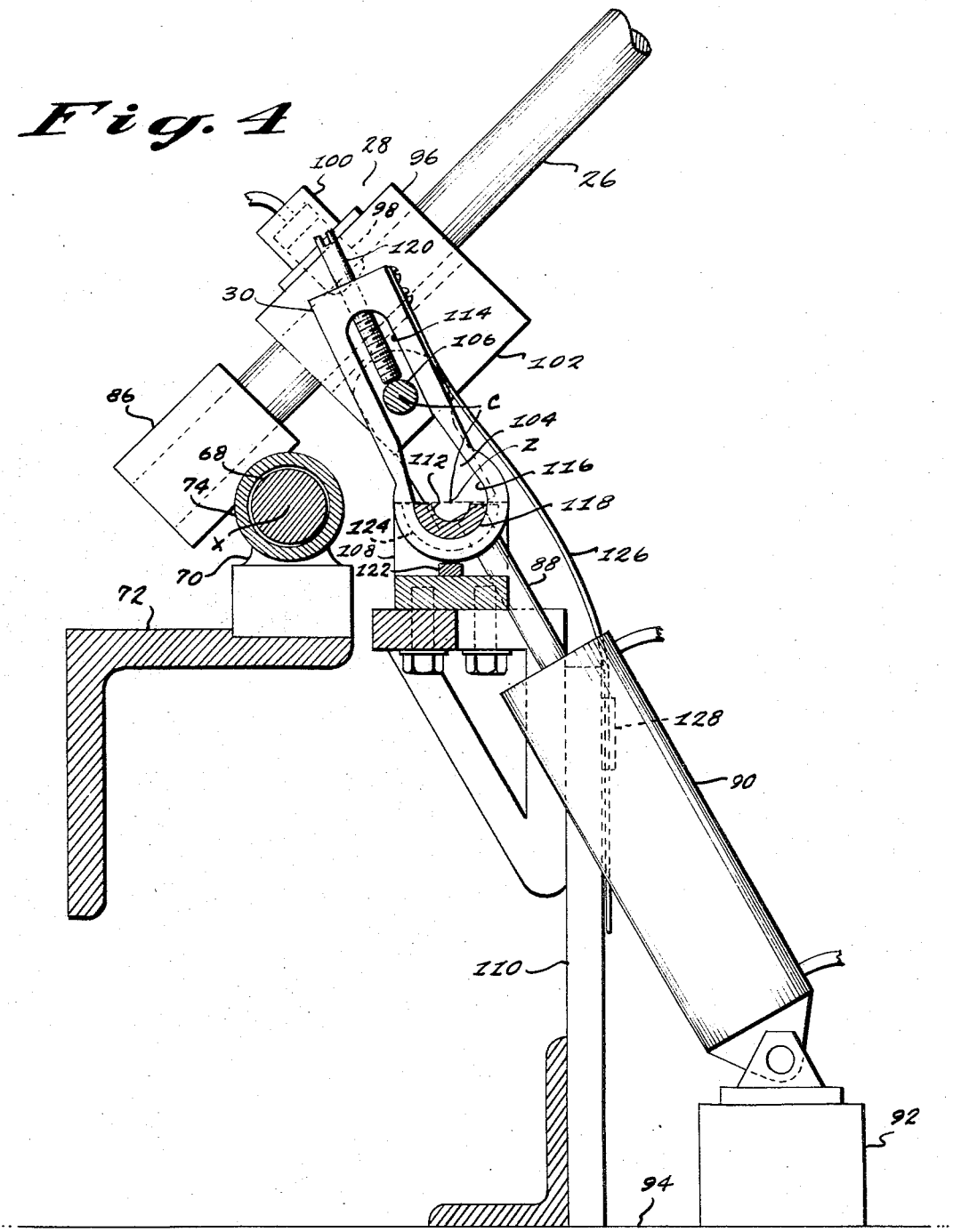

United States Patent Office 3,344,820
Patented Oct. 3, 1967

3,344,820
INDEX CONTROLLING MEANS FOR A
TUBULAR SAWING APPARATUS
Richard Ferguson, Charlotte, N.C., assignor to The Terrell Machine Company, Charlotte, N.C., a corporation of North Carolina
Filed June 15, 1965, Ser. No. 464,006
8 Claims. (Cl. 143—85)

The present invention relates to an improved means for controlling circular indexing of a wooden workpiece in a tubular sawing apparatus in a reliable and consistent manner such that cylindrical billets may be cut with the apparatus rapidly and efficiently, and represents an improvement in this respect over the arrangement disclosed for the same purpose in U.S. Patent No. 3,163,190, granted December 29, 1964.

In cutting cylindrical billets from a wodden workpiece with a tubular saw, special provision must be made to allow escape of the kerf chips in order to maintain the cutting action of the saw. One of the ways in which this is done is by overlapping the successive saw kerfs so that the chips can escape into the void left by the previous cut, but to do this reliable indexing is essential to assure overlapping within the wall thickness of the saw so that an opening is provided without marring the billet being cut. Thus it is important to maintain a particular center-to-center distance between successive cuts, and when indexing circularly as when cutting from log sections, this center-to-center distance must be maintained at different spacings of the indexing axis from the sawing axis. Such center-to-center indexing is obtained consistently by the present invention regardless of the indexing radius and is accomplished with a simple and reliable mechanism that requires no complex adjustment or control to compensate for changes in the indexing radius so that consistent high-speed production is possible. The simplicity and reliability of the control of the present invention is particularly significant in working with rough log sections where additional indexing is frequently necessary to avoid an irregularity in the contour or grain in the section, for with the present invention the proper control of the extent of indexing can be immediately resumed without special adjustment once the irregularity has been bypassed.

Briefly described, the index controlling means of the present invention is incorporated in an apparatus that supports a wooden workpiece for indexing about an axis and manipulates the workpiece to have a plurality of cylindrical billets cut successively therefrom by a tubular saw operating along an axis parallel to the indexing axis with the workpiece being shiftable laterally to change the spacing between the indexing and saw axes to make cuts at different radii from the indexing axis and includes means incorporating a positioning element aligned with the saw axis and acting in relation to the element to determine the extent of circular indexing of the workpiece by a constant chord at any spacing of the indexing axis from the saw axis. With this imposition of the constant chord indexing at the saw axis, the same center-to-center distance results between cuts whatever the indexing radius is.

The features and advantages of the present invention are described at further length below in connection with the accompanying drawings, in which:

FIG. 2 is a vertical sectional view taken at 2—2 in FIG. 1;

FIG. 3 is an enlarged rear elevational of the index controlling means of the appparatus of FIG. 1; and FIG. 4 is an enlarged vertical section taken at 4—4 in FIG. 3.

Figure 1:
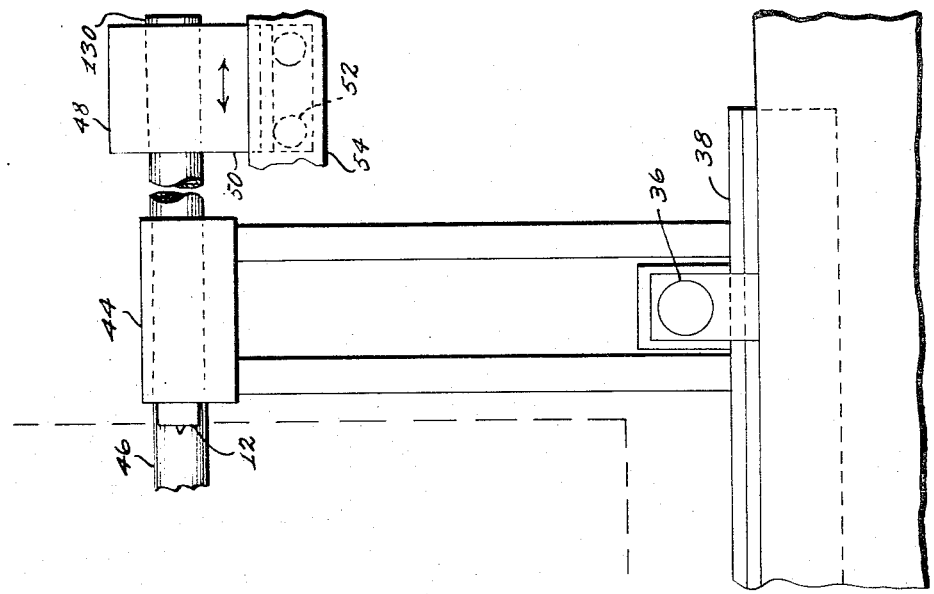
FIG. 1 is a fragmentary elevation of a tubular sawing apparatus incorporating index controlling means embodying the present invention, with portions of the apparatus omitted for clarity.
Figure 1:
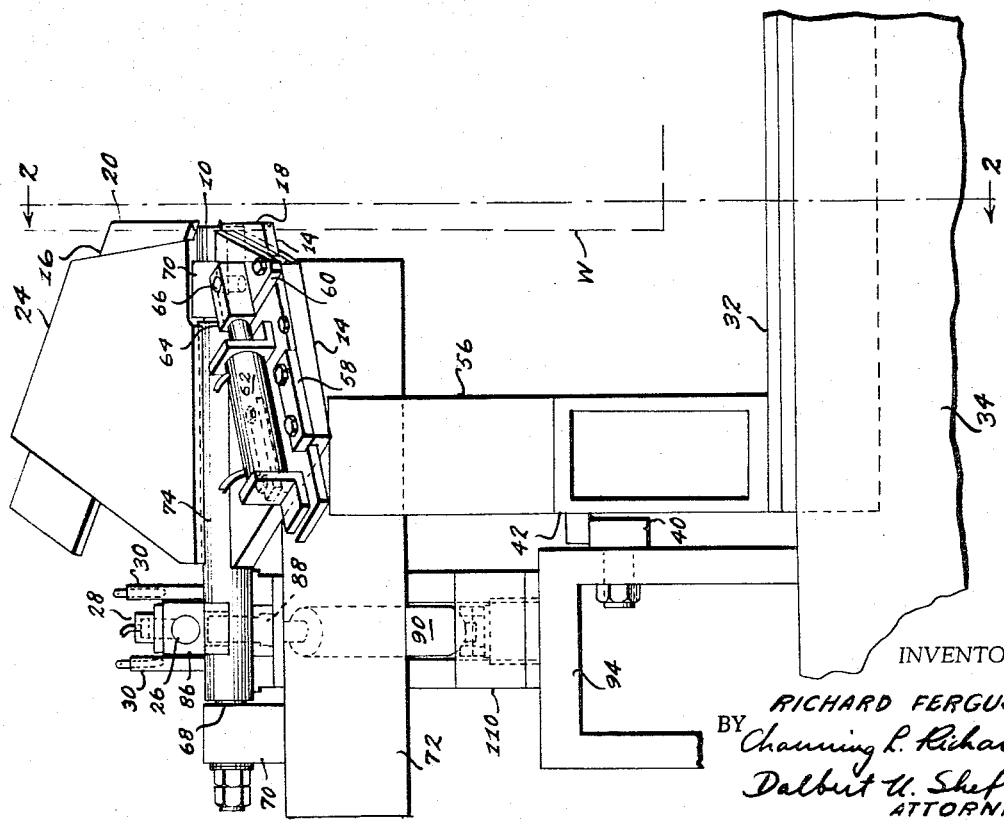

In the illustrated embodiment of the present invention, a wooden workpiece W is supported between a pair of aligned chuck elements 10 and 12 that are shiftable laterally to change the spacing between the indexing axis at X and the sawing axis at Z. A stationary dog 14 normally engages the workpiece W to hold it against movement about the indexing axis X but is retractable to disengage the workpiece W for indexing. An indexing dog 16 is pivotally mounted at the indexing axis X and is operable for projection endwise of the workpiece W to engage it for circular indexing and is additionally operable for retraction to disengage the workpiece W and recover following each indexing. These stationary and indexing dogs 14 and 16 are preferably formed by bar members having ends disposed as bits 18 and 20 for the dogging function and retractable through slide mountings 22 and 24 in planes radial to the indexing axis X at inclinations thereto that locate the engagement of the bit-shaped ends 18 and 20 with the workpiece W closely adjacent one of the chuck elements 10. The indexing dog 16 is operated to index the workpiece W circularly by an indexing arm 26 pivoted about the indexing axis and on which arm 26 is mounted a selectively slidable clamp mechanism 28 operable for alternatively gripping the arm 26 during indexing and releasing the arm for sliding thereon during lateral shifting of the workpiece in changing the spacing between the indexing and sawing axes. The extent of circular indexing is determined in relation to positioning elements, which in the illustrated embodiment are in the form of a pair of control members 30 pivoted in alignment with the sawing axis Z and engageable with the clamp mechanism 28 in lost motion relation with respect thereto in a manner that determines the extent of circular indexing by a constant chord at any spacing of the indexing axis X from the sawing axis Z.

Changing of the spacing of the indexing and sawing axes by lateral shifting of the aligned chuck elements 10 and 12 is accomplished by mounting the chuck elements on a subframe 32 slidably supported by the main frame 34, which has a cross-shaft 36 on which one end 38 of the subframe 32 slides and has a series of laterally aligned rollers 40 on which the other end 42 of the subframe rides with the cross-shaft 36 retaining the subframe in proper alignment to maintain the indexing axis X of the chuck elements 10 and 12 in parallel relation with respect to the stationary sawing axis Z. Shifting of the subframe may be accomplished in any conventional manner, such as by a hydraulic cylinder-piston mechanism (not shown).

The workpiece W is fixed in relation to the indexing axis X for lateral shifting therewith by being clamped between the chuck elements 10 and 12, with the chuck element 12 adjacent the subframe end 38 at the main frame cross-shaft 32 being shiftable axially between a retracted position for insertion or removal of a workpiece and an advanced position for clamping of the workpiece. Operation of the shiftable chuck element 12 is controlled by any conventional means, such as a hydraulic cylinder-piston mechanism mounted on the subframe 32 as indicated diagrammatically at 44.

Sawing of cylindrical billets from the workpiece W is performed by a tubular saw 46 at the sawing axis Z. This saw 46 is supported in bearings (not shown) for axial reciprocation and is driven by a motor of any conventional design as designated generally at 48, with the motor being mounted on a slidable carriage 50 that rolls on rollers 52 on a main frame portion 54 for reciprocation through the cutting and return strokes.

During each sawing operation the workpiece W is held in a fixed position by the stationary dog 14 adjacent the stationary chuck element 12. This dog 14 has its bit end 18 generally parallel to the end of the workpiece W for dogging action thereagainst and is retractably mounted in the slide mounting 22 which is attached to the upstanding portion 56 of the subframe 32 on which the stationary chuck element 10 is supported. The dog 14 is retained in sliding disposition in the mounting 22 by gibs 58 secured to the mounting and extending partially over the dog and by a cover plate 60 secured to the mounting 22 and extending over the dog adjacent its bit end 18. The dog 14 is manipulated by a hydraulic cylinder 62 mounted on the dog and operable through a piston rod 64 attached to a stud 66 on the cover plate 60 to slide the dog between an advanced dogging position (FIG. 1) in engagement with the workpiece W and a retracted position at which it is disengaged from the workpiece W to permit indexing or removal of the workpiece.

The chuck elements 10 and 12 are preferably fixed against rotation to serve as dead center supports for the workpiece W at the indexing axis X, although they could if desired be mounted for free rotation about the indexing axis. The chuck element 10 at the stationary dog 14 is mounted at the end of a shaft 68 that is held in axial alignment along the indexing axis X by spaced supports 70 that are secured to a platform 72 of the subframe 32 and between which supports the chuck shaft 68 carries a rotatable tubular sleeve 74 on which is secured the slide mounting 24 for the indexing dog 16, which is retained in sliding position in the mounting 24 by gibs 76 and a cover plate 78 on which is a stud 80 to which is attached the piston rod 82 that extends into the hydraulic cylinder 84 mounted on the dog 16 for reciprocation of the indexing dog 16 between an advanced workpiece engaging position (FIG. 1) in which it is operated to index the workpiece W and a retracted position in which it is free of the workpiece for pivoting in a cocking action to its initial indexing position.

The indexing dog 16 is manipulated through its circular indexing and cocking strokes by the indexing arm 26 that is secured in and extends from a mounting bracket 86 fixed on the tubular sleeve 74 with the arm 26 disposed in a radial plane with respect to the indexing axis X such that it will pivot about the indexing axis as a center and will oscillate the tubular sleeve 74 to which it is secured and through the sleeve will oscillate the indexing dog 16.

The indexing arm 26 is pivoted through its indexing and cocking strokes by a piston rod 88 that is reciprocated by a hydraulic cylinder 90, the closed end of which is pivotally mounted on a block 92 on a cross-beam 94 of the main frame 34. The piston rod 88 is connected through the slidable clamp mechanism 28 to the indexing arm 26, which mechanism 28 includes a bored block 96 slidably mounted on the indexing arm 26 to permit sliding movement of the arm with respect thereto during lateral shifting of the subframe 32 to change the spacing between the indexing axis X and the sawing axis Z with a hydraulically operated clamp shoe 98 contained in a housing 100 on the block 98 and extending through the block into clamping engagement with the indexing arm 26 to clamp the block 96 to the arm 26 during indexing and releasable to allow the aforementioned sliding of the arm in the block. The lower portion 102 of the block 96 is bifurcated for straddling the head 104 of the piston rod 88 and for support of a connecting pin 106 to which the piston rod head 104 is pivotally attached to connect the piston rod 88 to the slidable clamp mechanism 28.

The connecting pin 106 is spaced from the indexing arm 26 to the same extent as is the indexing axis X and is normally retained in alignment with the sawing axis Z, which is in the same horizontal plane as the indexing axis X, with the result that the indexing arm 26 is normally horizontally disposed so that sliding of the arm in the block 96 will not cause any angular displacement of the arm 26. The disposition of the connecting pin 106 in sawing axis alignment is provided by the seating of the ends of the pin in a pair of brackets 108 mounted at the sides of the block 96 on an upstanding support 110 secured to the aforementioned main frame crossbeam 94, with the support 110 being open centrally to accommodate the piston rod 88 and cylinder 90. Each of these pin supporting brackets 108 has a pin seat 112 formed therein of semi-circular contour shaped to mate with the connecting pin 106 and position it in sawing axis alignment. To prevent kerf chips from accumulating on the pin seats 112, which would prevent full seating of the connecting pin 106 in the seats in sawing axis alignment, the pin supporting brackets 108 are preferably formed with air passages (not shown) that open at the pin seats 112 and are connected otherwise to a source of air under pressure to provide air jets that act at the seats to clear the kerf chips therefrom.

The extent of movement of the connecting pin 106 from the pin seats 112 during each indexing oscillation is determined by the pair of control members 30, one at each side of the slidable clamp mechanism 28, having closed slots 114 in which the ends of the connecting pin 106 ride in a lost motion action during indexing. The lower end 116 of each control member slot 114 is enlarged for seating on the semi-circular exterior 118 of extensions of the pin seat 112 for pivoting of the control members 30 about the sawing axis Z to allow the control members to follow the connecting pin 106 during arcuate movement thereof. An adjustable stop rod 120 is threaded in each control member 30 at the outer end of each slot 114 for abutment of the connecting pin 106 thereagainst to limit movement thereof and thereby determine the extent of circular indexing of the workpiece W by the indexing arm 26.

The control members 30 are retained in alignment with the sawing axis Z by the exteriors 118 of the extensions of the pin seats 112 in proximity to which they are retained when the connecting pin 106 is in the seats 112 by blocks 122 extending upwardly from the brackets 108 below the extensions of the pin seats 112. Further, the control members 30 are retained axially for proper engagement with the ends of the connecting pin 106 by enlargements 124 outwardly of the control members and under the pin seats 112 that prevent outward axial shifting of the control members 30. In addition, the control members are held in a generally upright position in readiness for following the upward movement of the connecting pin and to prevent pivoting to a downward position that would cause the slot enlargements 116 to cover the pin seats 112 and prevent movement of the connecting pin 106 therefrom, by flat spring strips 126 (shown in light dotted lines in FIG. 3 for clarity of illustration of the elements therebehind) screwed to the upper portions of the control members 30 and extending downwardly along the upstanding support 110 adjacent which they are retained by cover plates 128 secured to the support 110 and extending over the strips 126.

As the connecting pin 106 is aligned with the sawing axis Z and pivots about the indexing axis X, it follows the same arcuate path during circular indexing as does the saw cut formed in the workpiece by the tubular saw 46 and will always follow the same path as the saw cut at any spacing of the indexing axis X from the sawing axis Z, with the result that the limitation to movement imposed by the control members 30 on the connecting pin 106 will be identically imposed, through the indexing arm 26 and indexing dog 16, on the extent of indexing of the workpiece W at the sawing axis Z. Further, as the control members 30 are pivoted at the sawing axis Z and follow the connecting pin 106, the extent of indexing can be measured as a chord of the indexing arc extending from the sawing axis Z to the center of the connecting pin 106 when stopped against the stop rod 120 (see FIG. 4), and for any setting of the stop rod 120 this chordal distance will remain constant for all spacings between the indexing axis X and sawing axis Z while the arcuate extent of indexing to produce this constant chord will vary at different spacings between axes. Thus the center-to-center distance between successive saw cuts, which distance is identical to the distance between the extreme positions of the connecting pin 106, will be identical to the constant chord regardless of axes spacings and a desired center-to-center spacing will be imposed and maintained efficiently without adjustment at all spacings between the indexing axis X and sawing axis Z such that once a particular constant chord is set by adjustment of the stop rod 120 to provide an optimum center-to-center distance for a given saw diameter, no further adjustment of the control members 30 is necessary when shifting from one indexing radius to another to cut a series of billets at a new spacing of the indexing axis X from the sawing axis Z. This not only simplifies the mechanics and control of indexing, but assures a consistent spacing between saw cut centers so that sufficient overlapping of the cuts is always obtained to permit escape of the chips from the cut being made into the preceding cut without overlapping of the preceding cut into the circumference of the billet being cut, which would obviously result in a defective billet.

An example of the constant chord relationship is shown in FIG. 2, in which a workpiece W is seen to have an outer series of cuts A formed therein at a stop rod 120 setting determined in relation to the diameter of the tubular saw 46 being used to produce the desired constant chord C between centers of cuts A for proper overlapping to allow chip escape without marring billets. Also shown in FIG. 2 is an inner series of cuts B made at a shortened indexing radius with the same stop rod 120 setting with the result that the same constant chord C spacing is obtained to provide optimum center-to-center spacing between cuts with the extent of angular indexing necessarily increased to produce this constant chord C at the shorter radius. FIG. 4 illustrates, on an enlarged scale, the same constant chord C being imposed at an even shorter indexing redius with a greater angular extent necessary to obtain the constant chord.

In cutting the first billet from the workpiece W there will, of course, be no preceding cut into which chips may escape and, if the cut cannot be made to overlap the workpiece periphery because of contour deformities or imperfections at the periphery of the workpiece, a slotting saw (not shown) may be used in advance of the tubular saw 46 to provide a chip escape slot 156 as shown in FIG. 2. A slotting saw may also be used when making the first cut following an increased indexing beyond the constant chord, which may be necessitated to avoid workpiece contour irregularities or imperfections. A slotting saw for this purpose is disclosed in detail and claimed in copending application Ser. No. 152,896, filed November 16, 1961, now U.S. Patent No. 3,207,191, granted September 21, 1965.

In using the sawing apparatus described herein, a wooden workpiece W is first positioned between the chuck elements 10 and 12 with its estimated center aligned with the indexing axis X. The clamping mechanism 44 for the chuck element 12 is then operated to clamp the workpiece W between the chuck elements. The slidable subframe 32 is then shifted to position the workpiece W with respect to the sawing axis Z for making the first series of cuts and the workpiece is rotatably positioned for making the first cut, in which posiiton it is retained by clamping of the stationary dog 14 against the end of the workpiece W.

The stop rods 120 of the control members 30 are set in relation to the diameter of the particular tubular saw 46 being used to determine a constant chord indexing in an extent less than the outer diameter of the saw and greater than the inner diameter of the saw so that there will be sufficient overlapping of the kerfs for chip escape without overlapping into the circumference of the billet being cut.

The tubular saw 46 is then operated to cut the first billet with the aforementioned slotting saw operated if necessary to provide an advance slot for chip escape. During the sawing operation the indexing cylinder 90 is actuated to extend the piston 88 to cock the indexing arm upwardly to the extent determined by abutment of the connecting pin 106 against the stop rods 120 of the control members 30, thereby cocking the indexing dog 16 upwardly the same arcuate extent, with the indexing dog 16 being in retracted position out of workpiece engagement during this cocking action. Upon retraction of the saws, the indexing dog 16 is actuated to clamp the end of the workpiece W and the stationary dog 14 is retracted. The indexing cylinder 90 is then reversely actuated to retract the piston 88 to pivot the indexing arm 26 and, through the sleeve 74, the indexing dog 16 and clamped workpiece W about the indexing axis X in a clockwise direction (FIG. 2) until the connecting pin 106 seats in the pin seats 112, thereby determining the extent of indexing as the constant chord C to position the workpiece at the sawing axis Z in proper position for making the next cut. When an imperfection or contour irregularity occurs at the sawing axis an additional full or partial indexing is made without sawing, following which it may again be necessary to use the slotting saw.

When the desired indexing has been completed, the stationary dog 14 is again advanced to hold the workpiece W while the saw 46 repeats its sawing and retraction operation, during which time the indexing dog 16 is retracted and the action of the indexing cylinder 100 reversed for cocking of the indexing elements in readiness for repeating the indexing stroke as soon as the saw is fully retracted. The indexing and sawing sequence is then repeated until the series of cuts at the initial indexing radius has been completed, after which the subframe 32 is shifted laterally toward the sawing axis Z for cutting a succeeding series of billets inwardly of the first, preferably with the first cut of the second series overlapping one of the cuts in the first series to provide for adequate chip escape.

This sequence of operation is continued through a last series of cuts close to the indexing axis X, with the stationary dog 14 and indexing dog 16 being arranged as heretofore described for action close to the chuck element 10 at the center of the workpiece and being further arranged angularly out of the path of the saw 46 so that the last series of cuts can be made close to the center of workpiece W.

As the billets are cut from the workpiece W by the tubular saw 46, they remain in the interior of the saw and are advanced by succeeding billets through the saw until they are discharged from the outer end 130 thereof.

At the end of the operation, the slidable subframe 32 is shifted away from the sawing axis and the clamp mechanism 44 for the chuck element 12 reversed to retract the chuck element and allow removal of the workpiece, following which another workpiece is mounted in the apparatus and the operation repeated.

The above-detailed description of a particular embodiment of the present invention is for purposes of illustration only and it is to be understood that the present invention may be embodied as well in various modifications. For example, the positioning elements, which in the illustrated embodiment are in the form of a pair of control members 30, could take other forms or could be mounted otherwise, as by stationary pins fixed on the support 110 or otherwise mounted in sawing axis alignment for engagement with members similar to the control members 30 but pivotally mounted on the block 96 of the clamp mechanism 28, in hanging disposition, which would eliminate the need for the spring strips 126 as the hanging members could not pivot out of an operative position. Similarly the other components could take other forms and arrangements within the scope of the present invention, which is not intended to be limited by this description or otherwise except as defined by the appended claims.

I claim:

1. In a tubular sawing apparatus for cutting cylindrical billets from a wooden workpiece in which the workpiece is supported for circular indexing about an axis parallel to the tubular sawing axis and is shiftable laterally to change the spacing between said indexing and sawing axes, the improvement comprising means incorporating a positioning element aligned axially with said sawing axis, and means acting in relation to said element to determine the extent of circular indexing of said workpiece by a constant chord at any spacing of the indexing axis from the sawing axis.

2. In a tubular sawing apparatus, the improvement according to claim 1 and characterized further in that said positioning element is in the form of a control member pivoted in alignment with said sawing axis and acting in lost motion relation with respect to said circular indexing to impose said constant chord extent thereon at any spacing of the indexing axis from the sawing axis.

3. In a tubular sawing apparatus, the improvement according to claim 2 and characterized further in that said related means includes an indexing arm pivoted about said indexing axis and acting to index said workpiece circularly, and in that said control member acts in said lost motion relation at said indexing arm.

4. In a tubular sawing apparatus, the improvement according to claim 3 and characterized further in that said related means includes a selectively slidable clamp mechanism on said indexing arm engaging said control member in said lost motion relation, said clamp mechanism being operable for alternatively gripping said arm during indexing and releasing the same for sliding thereon during lateral shifting of said workpiece in changing the spacing between said indexing and sawing axes.

5. In a tubular sawing apparatus, the improvement according to claim 1 and characterized further in that said related means includes an indexing dog pivotally mounted at said indexing axis and operable for projection endwise of said workpiece to engage the same for said circular indexing, said indexing dog being additionally operable for retraction to disengage said workpiece following each indexing to allow positioning of said dog for subsequent indexing.

6. In a tubular sawing apparatus, the improvement according to claim 5 and characterized further in that said related means includes a stationary dog normally engaging said workpiece to hold the same against movement about said indexing axis and retractable to disengage said workpiece for indexing of the same by said indexing dog.

7. In a tubular sawing apparatus, the improvement according to claim 6 and characterized further in that said stationary dog is formed by a bar member having an end thereof shaped as a bit for the dogging function, and in that said dog is retractable through a slidable mounting of said bar member in a plane radial to said axis at an inclination to said axis that locates the normal engagement of said bit-shaped end with said workpiece closely adjacent said indexing axis.

8. In a tubular sawing apparatus for cutting cylindrical billets from a wooden workpiece in which the workpiece is supported between a pair of aligned chuck elements for circular indexing about an axis parallel to the tubular sawing axis and is shiftable laterally to change the spacing between said indexing and sawing axes, the improvement comprising a stationary dog normally engaging said workpiece to hold the same against movement about said indexing axis and retractable to disengage said workpiece for indexing thereof, an indexing dog pivotally mounted at said indexing axis and operable for projection endwise of said workpiece to engage the same for said circular indexing and additionally operable for retraction to disengage said workpiece following each indexing to allow positioning of said indexing dog for subsequent indexing, said dogs being formed by bar members having ends thereof disposed as bits for the dogging function and retractable through slidable mountings of said bar members in planes radial to said indexing axis at inclinations to said indexing axis that locate the engagement of said bit-shaped ends with said workpiece closely adjacent one of said chuck elements, an indexing arm pivoted about said indexing axis and acting to pivot said indexing dog to index said workpiece circularly, a selectively slidable clamp mechanism on said indexing arm operable for alternatively gripping said arm during indexing and releasing the same for sliding thereon during lateral shifting of said workpiece in changing the spacing between said indexing and sawing axes, and a control member pivoted in alignment with said sawing axis and engageable with said clamp mechanism in lost motion relation with respect thereto for determining the extent of circular indexing of said workpiece by a constant chord at any spacing of the indexing axis from the sawing axis.

References Cited
UNITED STATES PATENTS 3,207,191   9/1965   Ervin _____ 143—85

DONALD R. SCHRAN, *Primary Examiner.*